Oct. 17, 1950         F. E. STOREY         2,526,095
GARMENT HANGER SUPPORT FOR VEHICLES
Filed Dec. 9, 1947
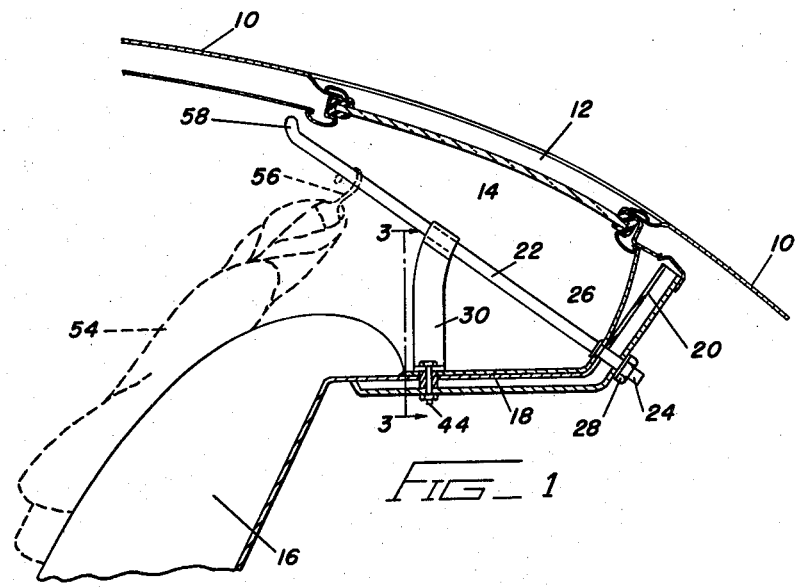
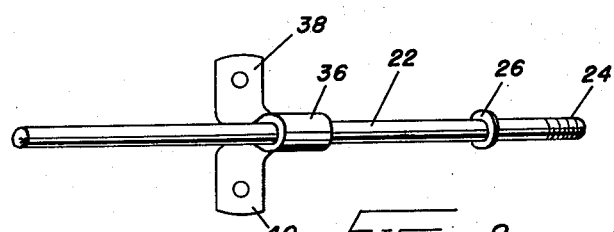
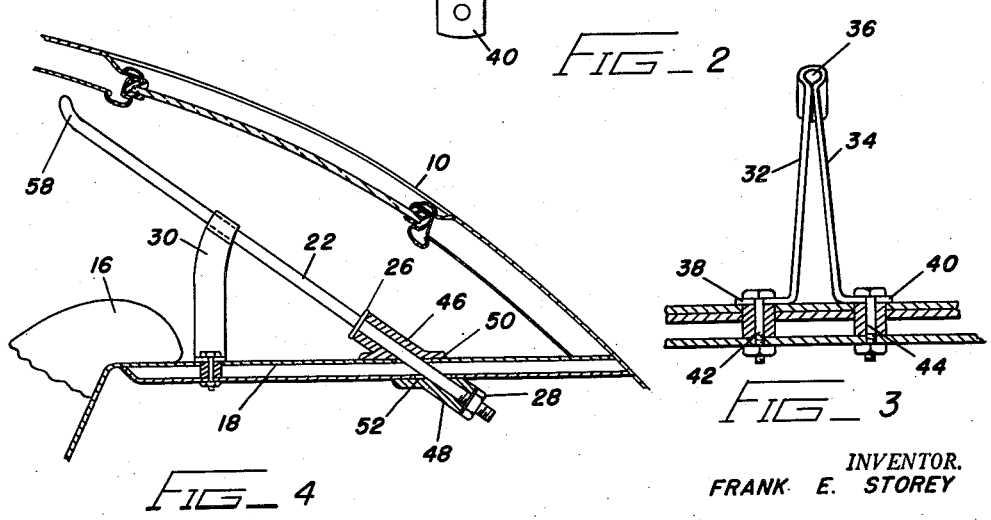
INVENTOR.
FRANK E. STOREY
ATTORNEY Patented Oct. 17, 1950

2,526,095

UNITED STATES PATENT OFFICE 2,526,095

GARMENT HANGER SUPPORT FOR VEHICLES

Frank E. Storey, Grosse Pointe Woods, Mich., assignor to Packard Motor Car Company, Detroit, Mich., a corporation of Michigan Application December 9, 1947, Serial No. 790,614

3 Claims. (Cl. 224—29)

This invention relates to motor vehicles, and more particularly to a garment hanger supporting member for use in motor vehicles.

It is frequently necessary to carry clothing in automobiles, and in many instances it is undesirable to pack them in travelling bags because they become wrinkled, and such packing is frequently inconvenient and time consuming.

An object of my invention is therefore to provide a garment hanger supporting member that may be permanently secured in an automobile body for use whenever needed.

A further object of the invention is to provide a garment hanger supporting device that can be sold as an automotive accessory and which can readily be installed in virtually all automobiles.

Another object of the invention resides in the provision of a garment hanger supporting rod secured to a fixed portion of the body behind a seat and extending forwardly and upwardly to overlie the seat whereby garments carried by hangers positioned on the rod drape down over the back of the seat.

Yet a further object is to provide a garment hanger supporting member adapted to be secured in an automobile body to overlie a seat in such a manner that when not in use the hanger supporting member does not interfere with passengers in the seat.

Still another object of this invention resides in the provision of a garment hanger supporting member that can be positioned at any desired location transversely of a vehicle body to permit garments positioned on the hangers to drape down over a desired portion of a seat back.

Other objects of this invention will appear in the following description and appended claims, reference being had to the accompanying drawings forming a part of this specification wherein like reference characters designate corresponding parts in the several views.

Fig. 1 is a fragmentary longitudinal sectional view, partly in elevation, of a motor vehicle body incorporating this invention.

Fig. 2 is a top plan view of the garment hanger supporting member.

Fig. 3 is a sectional view taken substantially on the line 3—3 of Fig. 1 looking in the direction of the arrows.

Fig. 4 is a view similar to Fig. 1 illustrating a modified form of the invention.

It is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Fig. 1 illustrates a portion of a vehicle body having a top panel 10 provided with a cutout section 12 to receive a rear window 14. The body may be of the sedan or coach type having two or more longitudinally spaced seats, or it may be of the coupe type having a single seat. The seat is provided with a back 16. A substantially horizontal support or panel 18 having its front edge connected to the back 16 of the seat may have an angularly related section 20 connected to the top panel 10 of the body.

My improved hanger supporting member may be of any desired form to position the garment hangers above the seat back 16. In the embodiment illustrated a member such as a rod 22 is connected to the vehicle body and extends forwardly and upwardly therefrom to overlie the seat back 16. The rod 22 has its lower end 24 threaded and is provided with a stop member or washer 26 secured thereto at a point spaced from the threaded end 24. The lower end of the rod 22 is adapted to project through an aperture in the angularly related section 20 of the panel 18 adjacent the body panel 10, a nut 28 being provided to clamp the rod 22 to the panel.

A brace 30 is provided to engage an intermediate portion of the rod 22 and to hold it in a predetermined position with reference to the seat back 16. The brace 30 may of course be of any desired form but is illustrated as having angularly related members 32 and 34 interconnected by a curved section 36 adapted to encircle and engage the rod 22. The members 32 and 34 have oppositely extending flanges 38 and 40 adapted to be secured to the panel 18 adjacent the seat back 16 in any convenient manner as by bolts 42 and 44.

The embodiment of the invention illustrated in Fig. 4 is similar in many respects to that illustrated in Fig. 1. It will be noted that in this embodiment of the invention the panel 18 extends horizontally from the seat back 16 to the top panel 10 of the body behind the seat. Suitable fittings 46 and 48 having angularly related surfaces 50 and 52 are projected over the threaded end 24 of the rod 22 to clamp the panel 18 between the stop member 26 and the nut 28.

The rod 22 may be positioned in the vehicle body at any desired point transversely of the seat. In vehicles having a plurality of longitudinally spaced seats the rod 22 is of course positioned behind the rear seat, and is preferably positioned adjacent one side of the vehicle, as behind the driver's seat so that when the hanger support is in use the remainder of the seat is available for occupancy by passengers. In vehicles having a single seat such as of the coupe type, the rod 22 is positioned behind the seat, and is spaced transversely from the driver's seat.

When in use garments such as illustrated at 54 (Fig. 1) are placed on hangers 56 of any convenient type, and the hooks of the hangers are positioned on the rod 22. The garments drape down over the seat back 16 and remain substantially straight and unwrinkled.

Attention is directed to the fact that the weight of the garments 54 on the hangers 56 tends to pull the hangers downwardly and rearwardly on the rod 22, and that a portion of the weight of the garments is supported by the seat back 16. It is therefore unnecessary to provide notches or stops on the rod 22 to separate a plurality of hangers. The movement of the car will induce the garments to hang straight over the seat back 16 so that they do not become wrinkled or mussed.

If desired a cover may be placed over the individual garments on a hanger 56 or over a group of garments carried by a plurality of hangers positioned on the rod 22 to protect them from dust or dirt.

The forward end of the rod 22 is curved upwardly or hooked as illustrated at 58 to prevent the hangers 56 from sliding forwardly and slipping off of the rod when the vehicle is decelerated rapidly as by a sudden application of the brakes. It will be noted that the forward end of the rod is positioned adjacent the top body panel 10 above the seat back 16 so that it does not interfere with passengers seated in the seat when the garment hanger is not in use.

It will be understood that various forms of the invention other than that described above may be used without departing from the spirit or scope of the invention.

I claim:

1. The combination with an automobile body having a passenger compartment including a seat back, a panel extending from the seat back to the body behind the seat, of a garment hanger supporting rod having one of its ends secured to the panel adjacent the body and extending forwardly and upwardly, and a brace secured to the panel adjacent the seat back and clamping an intermediate portion of the rod to support the rod in said forwardly and upwardly extending position.

2. In an automobile body having a passenger compartment including a seat back, the combination with a transversely extending panel having its front edge connected to the seat back and having its rear edge connected to the body behind the seat back, of a garment hanger supporting member having one end connected to the panel and extending forwardly to overlie the rear portion of the seat back adjacent one side of the body, and a brace clamping said member and secured to the panel forwardly of the connection of the supporting member to the panel to maintain the supporting member in said overlying position relative to the seat back.

3. The combination with an automobile body having a passenger compartment including a seat back, a panel having its front edge connected to the seat back adjacent the top thereof and having its rear edge connected to the body behind the seat back, of a garment hanger supporting rod having one of its ends secured to the panel adjacent the body and having its other end positioned to overlie the top of the seat back, and a brace secured to the panel adjacent the seat and clamping an intermediate portion of the rod to support the rod in overlying relation to the top of the seat back.

FRANK E. STOREY.

REFERENCES CITED

The following references are of record in the file of this patent:

UNITED STATES PATENTS

| Number | Name | Date |
|---|---|---|
| 1,722,122 | Wilson | July 23, 1929 |
| 2,196,196 | Dorsey | Apr. 9, 1940 |
| 2,447,908 | Hoots | Aug. 24, 1948 |